(12) United States Patent
Hu et al.

(10) Patent No.: US 12,163,880 B2
(45) Date of Patent: Dec. 10, 2024

(54) DEVICE AND SPECTROMETER FOR QUANTITATIVELY DETECTING CARBON 14 ISOTOPE BY DUAL-WAVELENGTH METHOD

(71) Applicant: University of Science and Technology of China, Hefei (CN)

(72) Inventors: Shuiming Hu, Hefei (CN); Cunfeng Cheng, Hefei (CN); Yandong Tan, Hefei (CN)

(73) Assignee: University of Science and Technology of China, Hefei (CN)

( * ) Notice: Subject to any disclaimer, the term of this patent is extended or adjusted under 35 U.S.C. 154(b) by 0 days.

(21) Appl. No.: 17/789,497

(22) PCT Filed: May 13, 2021

(86) PCT No.: PCT/CN2021/093487
§ 371 (c)(1),
(2) Date: Jun. 27, 2022

(87) PCT Pub. No.: WO2022/188260
PCT Pub. Date: Sep. 15, 2022

(65) Prior Publication Data
US 2024/0167945 A1    May 23, 2024

(30) Foreign Application Priority Data
Mar. 12, 2021    (CN) .......................... 202110268351.0

(51) Int. Cl.
*G01N 21/39*    (2006.01)
*G01N 21/03*    (2006.01)
(Continued)

(52) U.S. Cl.
CPC ..... *G01N 21/3151* (2013.01); *G01N 21/0303* (2013.01); *G01N 21/0332* (2013.01); *G01N 21/39* (2013.01); *G01N 21/636* (2013.01)

(58) Field of Classification Search
CPC .......... G01N 21/3151; G01N 21/0303; G01N 21/0332; G01N 21/39; G01N 21/636
See application file for complete search history.

(56) References Cited

U.S. PATENT DOCUMENTS

| 5,394,236 A | 2/1995 | Murnik |
|---|---|---|
| 5,747,809 A | 5/1998 | Eckstrom |

(Continued)

FOREIGN PATENT DOCUMENTS

| AU | 2001272190 B2 | 1/2002 |
|---|---|---|
| CN | 1077284 A | 10/1993 |

(Continued)

OTHER PUBLICATIONS

International Search Report and Written Opinion for International Application No. PCT/CN2021/093487, mailed Dec. 1, 2021.

(Continued)

*Primary Examiner* — David P Porta
*Assistant Examiner* — Fani Polyzos Boosalis
(74) *Attorney, Agent, or Firm* — Wolf, Greenfield & Sacks, P.C.

(57) ABSTRACT

A device and a spectrometer for quantitatively detecting carbon 14 isotope by a dual-wavelength method. Two mid-infrared lasers with different wavelengths are locked in an optical cavity of a sample chamber, to ensure the two lasers are collinear. The cavity length of the optical cavity is adjusted by a cavity length adjusting unit, to tune the mode frequency of the optical cavity, and then tune the frequencies of the two mid-infrared lasers, so that the frequencies of the two mid-infrared lasers match with different energy levels of (Continued)

the target isotope molecule simultaneously. After the frequencies of the mid-infrared lasers match with the energy levels of the target isotope molecule simultaneously, the target isotope molecule is excited by two mid-infrared lasers simultaneously, and the optical cavity output signal of the second mid-infrared laser passing through the optical cavity is detected.

9 Claims, 2 Drawing Sheets

(51) Int. Cl.
*G01N 21/31* (2006.01)
*G01N 21/63* (2006.01)

(56) References Cited

U.S. PATENT DOCUMENTS

| | | | |
|---|---|---|---|
| 5,783,445 | A | 7/1998 | Murnick |
| 7,679,059 | B2 * | 3/2010 | Zhou .................. G01J 3/42 |
| | | | 250/343 |
| 10,732,099 | B2 * | 8/2020 | Deguchi ............. G01N 21/27 |
| 11,340,114 | B2 * | 5/2022 | Huang ................ G01J 3/08 |
| 2011/0164248 | A1 * | 7/2011 | Bushaw ........... G01N 21/3103 |
| | | | 356/318 |
| 2016/0139038 | A1 | 5/2016 | Oldsen et al. |
| 2016/0178517 | A1 | 6/2016 | Deguchi et al. |
| 2017/0307518 | A1 | 10/2017 | Marta et al. |
| 2018/0156718 | A1 | 6/2018 | Fleisher et al. |
| 2020/0203916 | A1 | 6/2020 | Iguchi et al. |
| 2020/0348227 | A1 | 11/2020 | Satou et al. |

FOREIGN PATENT DOCUMENTS

| | | |
|---|---|---|
| CN | 105514797 A | 4/2016 |
| CN | 107328722 A | 11/2017 |
| CN | 108827912 A | 11/2018 |
| CN | 109029740 A | 12/2018 |
| CN | 109066283 A | 12/2018 |
| CN | 111201433 A | 5/2020 |
| WO | WO 2019/142944 A1 | 7/2019 |

OTHER PUBLICATIONS

Karhu et al., Step-modulated decay cavity ring-down detection for double resonance spectroscopy. Optics Express. Oct. 29, 2018;26(22):29086-98.
First Office Action for Japanese Application No. 2022-540341, mailed Aug. 15, 2023.
Chedin et al.,. The carbon dioxide molecule: a new derivation of the potential, spectroscopic, and molecular constants. Journal of Molecular Spectroscopy. Oct. 1, 1984;107(2):333-42.
Amiot et al., The vibration-rotation spectrum of 14CO in the spectral range 2.40-3μm. Journal of Molecular Spectroscopy. Feb. 1, 1984;103(2):364-78.
International Preliminary Report on Patentability for International Application No. PCT/CN2021/093487, mailed Sep. 21, 2023.
JP2022-540341, Aug. 15, 2023, First Office Action.
Extended European Search Report for European Application No. 21904617.4, dated Nov. 29, 2023.
Galli et al., Spectroscopic detection of radiocarbon dioxide at parts-per-quadrillion sensitivity. Optica. Apr. 20, 2016;3(4):385-8.
Hu et al., Optical-optical double-resonance absorption spectroscopy of molecules with kilohertz accuracy. The Journal of Physical Chemistry Letters. Aug. 31, 2020;11(18):7843-8.

* cited by examiner

DEVICE AND SPECTROMETER FOR QUANTITATIVELY DETECTING CARBON 14 ISOTOPE BY DUAL-WAVELENGTH METHOD

This application is a national phase filing under 37 U.S.C. § 371 of International Application No. PCT/CN2021/093487, filed on May 13, 2021, which claims priority to Chinese Patent Application No. 202110268351.0, titled "Device and spectrometer for quantitatively detecting carbon 14 isotope by dual-wavelength method", filed with the China National Intellectual Property Administration on Mar. 12, 2021. The contents of these applications are incorporated herein by reference in their entirety.

FIELD

The present invention relates to the technical field of spectral detection, more particularly to a device and a spectrometer for quantitatively detecting carbon 14 isotope by a dual-wavelength method.

BACKGROUND

As the only radioactive carbon isotope in nature, the carbon 14 isotope has a half-life of about 5730 years. It is mainly produced by the interaction of cosmic rays with nitrogen in the earth's atmosphere, and the isotope abundance thereof in the earth's atmosphere is only $10^{-12}$.

Carbon 14 in the earth's atmosphere mainly exists in the form of $^{14}CO_2$ gas, which diffuses through the global biological carbon cycle. The content of Carbon 14 is basically stable, and is widely used in the fields of dating and tracing, forensic identification, environmental monitoring, drug metabolism, etc.

At present, laser spectroscopy is one of the important methods for the detection of carbon 14 isotope, and has great application potential in the quantitative detection of carbon 14 isotope. The main measurement principle of laser spectroscopy is to control the sample at a low temperature of 220K, and use the optical cavity ring-down spectroscopy method to measure the spectral signal of the carbon 14 isotope.

However, this laser spectroscopy method is limited by the Doppler linewidth of the spectrum itself, and cannot effectively distinguish the spectra of carbon 14 isotope from that of other carbon isotopes, or the spectra of carbon 14 isotope from that of other molecular isotopes, i.e., it is difficult to achieve accurate quantitative measurement.

SUMMARY

In view of this, in order to solve the above-described problems, the present invention provides a device and a spectrometer for quantitatively detecting carbon 14 isotope by a dual-wavelength method. The technical solution is as follows:

A device for quantitatively detecting carbon 14 isotope by a dual-wavelength method, the device comprising: a first laser source, a second laser source, a first laser locking module, a second laser locking module, a sample chamber and a signal detecting module;

the first laser source is used to output a continuous first mid-infrared laser: the second laser source is used to output a continuous second mid-infrared laser; the wavelengths of the first mid-infrared laser and the second mid-infrared laser are different;

the first laser locking module is used to lock the first mid-infrared laser in the optical cavity of the sample chamber; the second laser locking module is used to lock the second mid-infrared laser in the optical cavity of the sample chamber;

the sample chamber at least comprises a chamber length adjusting unit;

the cavity length adjusting unit is used to adjust the cavity length, to tune the mode frequency of the optical cavity, and then tune the frequencies of the first mid-infrared laser and the second mid-infrared laser, so that the frequency of the first mid-infrared laser and the frequency of the second mid-infrared laser match with different energy levels of the target isotope molecule simultaneously;

the signal detecting module is used to detect the optical cavity output signal of the second mid-infrared laser passing through the optical cavity after the laser frequencies and the energy levels of the target isotope molecule are matched simultaneously.

Preferably, in the above device, the tuning bandwidth of the first mid-infrared laser is greater than 1 MHz; the tuning bandwidth of the second mid-infrared laser is greater than 1 MHz, Preferably, in the above device, the first laser locking module is used to lock the first mid-infrared laser in the optical cavity of the sample chamber, comprising:

the first laser locking module is used to modulate and demodulate the frequency and phase of the first mid-infrared laser, and generate an error signal;

the first laser locking module is also used to generate a negative feedback signal according to the error signal, to control the frequency of the first mid-infrared laser, so that the first mid-infrared laser is locked in the optical cavity of the sample chamber;

the second laser locking module is used to lock the second mid-infrared laser in the optical cavity of the sample chamber, comprising:

the second laser locking module is used to modulate and demodulate the frequency and phase of the second mid-infrared laser, and generate an error signal;

the second laser locking module is also used to generate a negative feedback signal according to the error signal, to control the frequency of the second mid-infrared laser, so that the second mid-infrared laser is locked in the optical cavity of the sample chamber.

Preferably, in the above device, the first mid-infrared laser and the second mid-infrared laser are collinear in the sample chamber.

Preferably, in the above device, the optical cavity is a high-finesse optical cavity, and the fineness is greater than 10,000.

Preferably, in the above device, the cavity length adjusting unit is a piezoelectric ceramic unit.

Preferably, in the above device, the sample chamber further comprises a temperature control unit;

the temperature control unit is used to adjust the temperature of the optical cavity;

after adjustment, the fluctuation range of the temperature of the optical cavity is less than 100 mK.

Preferably, in the above device, the signal detecting module comprises a detecting unit;

the detecting unit is used to detect the optical cavity output signal of the second mid-infrared laser passing through the optical cavity.

Preferably, in the above device, the signal detecting module further comprises: a timing control unit;

wherein the timing control unit is used to control the working states of the cavity length adjusting unit and the detecting unit.

A spectrometer, the spectrometer comprising the device described in any of the above.

Compared with the prior art, the present invention realizes the following beneficial effects:

the present invention provides a device for quantitatively detecting carbon 14 isotope by a dual-wavelength method. Two mid-infrared lasers with different wavelengths are locked in an optical cavity of a sample chamber, so that the two mid-infrared lasers are collinear. The cavity length of the optical cavity is adjusted by the cavity length adjusting unit, to tune the mode frequency of the optical cavity and then tune the frequencies of the two mid-infrared lasers, so that the frequencies of the two mid-infrared lasers match with different energy levels of the target isotope molecule simultaneously. After the frequencies of the mid-infrared lasers and the energy levels of the target isotope molecule are matched simultaneously, the target isotope molecule is excited by two mid-infrared lasers simultaneously, and the optical cavity output signal of the second mid-infrared laser passing through the optical cavity is detected. That is to say, since the excitation of the target isotope molecule and the detection of the spectrum require two lasers to match with different energy levels of the target isotope molecule simultaneously, it greatly improves the selectivity of the spectral detection, thereby improving the spectral resolution ability, i.e., achieving the selection and resolution of the target isotope molecule.

BRIEF DESCRIPTION OF THE DRAWINGS

In order to illustrate the embodiments of the present invention or the technical solutions in the prior art more clearly, the drawings that are applied in the embodiments or the description of the prior art will be briefly introduced below. Obviously, the drawings in the following description are only the embodiments of the present invention. For those of ordinary skill in the art, other drawings can also be obtained according to the drawings provided without creative work.

DETAILED DESCRIPTION OF EMBODIMENTS

The technical solutions in the embodiments of the present invention will be clearly and completely described below with reference to the drawings of the embodiments of the present invention, Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

In order to make the above objects, features and advantages of the present invention more clearly understood, the present invention will be described in further detail below with reference to the drawings and embodiments.

Figure 1:
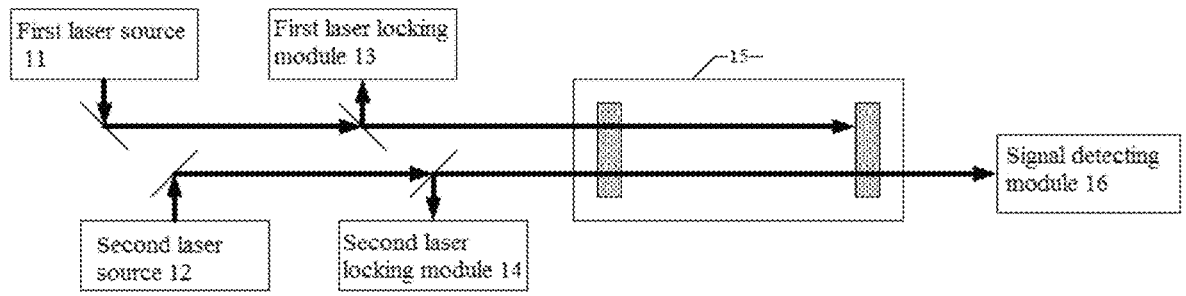
FIG. 1 is a schematic structural diagram of a device for quantitatively detecting carbon 14 isotope by a dual-wavelength method according to an embodiment of the present invention.

Referring to FIG. 1, FIG. 1 is a schematic structural diagram of a device for quantitatively detecting carbon 14 isotope by a dual-wavelength method according to an embodiment of the present invention.

The device comprises: a first laser source 11, a second laser source 12, a first laser locking module 13, a second laser locking module 14, a sample chamber 15 and a signal detecting module 16.

The first laser source 11 is used to output a continuous first mid-infrared laser; the second laser source 12 is used to output a continuous second mid-infrared laser; the wavelengths of the first mid-infrared laser and the second mid-infrared laser are different.

The first laser locking module 13 is used to lock the first mid-infrared laser in the optical cavity of the sample chamber 15; the second laser locking module 14 is used to lock the second mid-infrared laser in the optical cavity of the sample chamber 15; it should be noted that after the first mid-infrared laser and the second mid-infrared laser are locked in the optical cavity of the sample chamber 15, the first mid-infrared laser and the second mid-infrared laser are collinear in the sample chamber.

Figure 2:
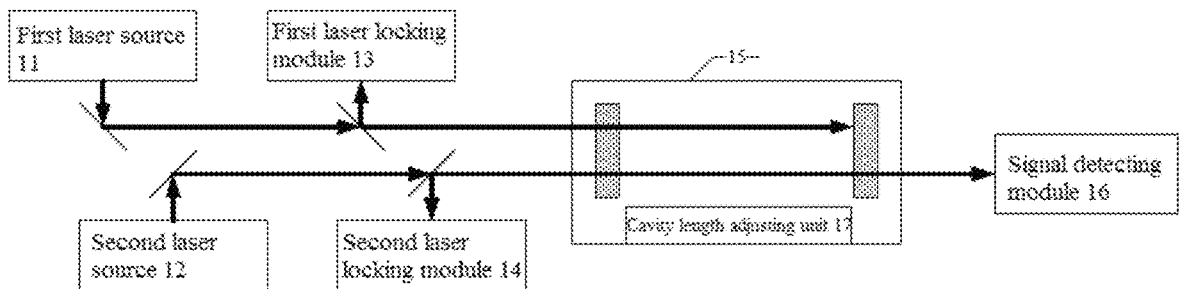
FIG. 2 is a schematic structural diagram of another device for quantitatively detecting carbon 14 isotope by a dual-wavelength method according to an embodiment of the present invention.

Referring to FIG. 2, FIG. 2 is a schematic structural diagram of another device for quantitatively detecting carbon 14 isotope by a dual-wavelength method according to an embodiment of the present invention.

The sample chamber 15 at least comprises a cavity length adjusting unit 17.

The cavity length adjusting unit 17 is used to adjust the cavity length of the optical cavity, to tune the mode frequency of the optical cavity, and then tune the frequencies of the first mid-infrared laser and the second mid-infrared laser, so that the frequency of the first mid-infrared laser and the frequency of the second mid-infrared laser match with different energy levels of the target isotope molecule simultaneously.

The signal detecting module 16 is used to detect the optical cavity output signal of the second mid-infrared laser passing through the optical cavity after the laser frequencies and the energy levels of the target isotope molecule are matched simultaneously.

Figure 3:
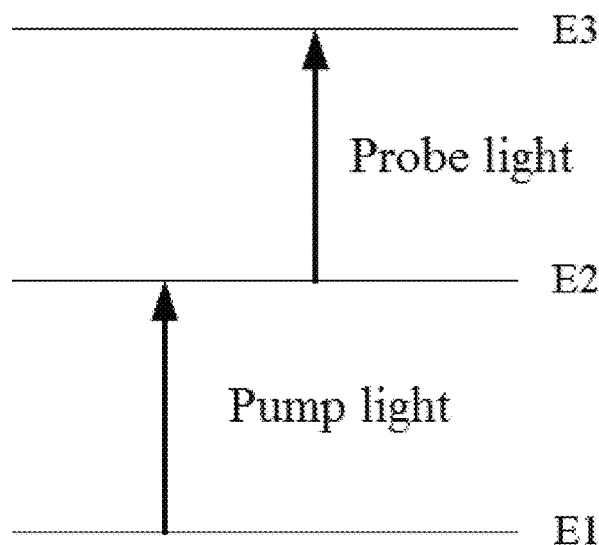
FIG. 3 is an energy level matching diagram of a device for quantitatively detecting carbon 14 isotope by a dual-wavelength method according to an embodiment of the present invention.

In this embodiment, referring to FIG. 3, FIG. 3 is an energy level matching diagram of a device for quantitatively detecting carbon 14 isotope by a dual-wavelength method according to an embodiment of the present invention.

The first laser source 1t is mainly used to provide pump light that matches with the energy levels E1 and E2 of the target isotope molecule as shown in FIG. 3, i.e., the first mid-infrared laser defined in the present invention.

After the first laser source 11 outputs a continuous first mid-infrared laser, the first mid-infrared laser is adjusted by the first laser locking module 13, to ensure that the first mid-infrared laser can be locked in the optical cavity of the sample chamber 15, so that the frequency of the first mid-infrared laser is consistent with one of the mode frequencies of the optical cavity.

The second laser source 12 is mainly used to provide probe light that matches with the energy levels E2 and E3 of the target isotope molecule as shown in FIG. 3, i.e., the second mid-infrared laser defined in the present invention.

After the second laser source 12 outputs a continuous second mid-infrared laser, the second mid-infrared laser is adjusted by the second laser locking module 14, to ensure that the second mid-infrared laser can also be locked in the optical cavity of the sample chamber 15, so that the frequency of the second mid-infrared laser is consistent with another one of the mode frequencies of the optical cavity.

Further, by the cavity length adjusting unit 17, the adjustment of the cavity length of the optical cavity of the sample chamber 15 is realized. The mode frequency of the optical cavity is changed by the adjustment of the cavity length, to further tune the frequencies of the first mid-infrared laser and the second mid-infrared laser, so that the frequency of the first mid-infrared laser matches with the energy levels E1 and E2 of the target isotope molecule, and the frequency of the second mid-infrared laser matches with the energy levels E2 and E3 of the target isotope molecule; i.e., the frequency of the first mid-infrared laser and the frequency of the second mid-infrared laser match with different energy levels of the target isotope molecule simultaneously.

After the frequency of the first mid-infrared laser and the frequency of the second mid-infrared laser match with different energy levels of the target isotope molecule simultaneously, the signal detecting module 16 is used to detect the optical cavity output signal of the second mid-infrared laser passing through the optical cavity, i.e., the transmission signal of the second mid-infrared laser passing through the optical cavity.

It should be noted that detecting the optical cavity output signal of the second mid-infrared laser passing through the optical cavity can be: any one of the cavity enhanced absorption spectroscopy signal, the cavity ring-down spectroscopy signal, and the noise-immune cavity enhanced optical heterodyne molecular spectroscopy signal.

It can be known that since the excitation of the target isotope molecule and the detection of the spectrum require two lasers to match with different energy levels of the target isotope molecule simultaneously, the device for quantitatively detecting carbon 14 isotope by a dual-wavelength method according to the present invention greatly improves the selectivity of spectral detection, thereby improving the spectral resolution ability, and achieving the quantitative detection of carbon 14.

Moreover, compared with the traditional laser spectroscopy method, it has high resolution and can realize the quantitative detection of carbon 14 isotope at room temperature.

That is to say, the device for quantitatively detecting carbon 14 isotope by a dual-wavelength method according to the present invention uses the idea of dual-wavelength energy levels matching to achieve the selection and resolution of the target isotope molecule, effectively distinguishing the spectra of carbon 14 isotope from that of other carbon isotopes, and the spectra of carbon 14 isotope from that of other molecular isotopes.

Further, based on the above embodiment of the present invention, the tuning bandwidth of the first mid-infrared laser is greater than 1 MHz;
the tuning bandwidth of the second mid-infrared laser is greater than 1 MHz.

In this embodiment, the output wavelength of the first mid-infrared laser has the function of fast tuning, and the tuning bandwidth thereof is greater than 1 MHz.

The output wavelength of the second mid-infrared laser also has the function of fast tuning, and the tuning bandwidth thereof is greater than 1 MHz.

Further, based on the above embodiment of the present invention, the first laser locking module 13 is used to lock the first mid-infrared laser in the optical cavity of the sample chamber 15, comprising:
the first laser locking module 13 is used to modulate and demodulate the frequency and phase of the first mid-infrared laser, and generate an error signal;
the first laser locking module 13 is further used to generate a negative feedback signal according to the error signal, to control the frequency of the first mid-infrared laser, so that the first mid-infrared laser is locked in the optical cavity of the sample chamber 15.

Further, based on the above embodiment of the present invention, the second laser locking module 14 is used to lock the second mid-infrared laser in the optical cavity of the sample chamber 15, comprising:
the second laser locking module 14 is used to modulate and demodulate the frequency and phase of the second mid-infrared laser, and generate an error signal;
the second laser locking module 14 is further used to generate a negative feedback signal according to the error signal, to control the frequency of the second mid-infrared laser, so that the second mid-infrared laser is locked in the optical cavity of the sample chamber 15.

In this embodiment, the first mid-infrared laser and the second mid-infrared laser need to be locked in the optical cavity of the sample chamber 15 simultaneously.

It should be noted that after the first mid-infrared laser and the second mid-infrared laser are locked in the optical cavity of the sample chamber 15, the first mid-infrared laser and the second mid-infrared laser are collinear in the sample chamber.

Further, based on the above embodiment of the present invention, the optical cavity is a high-finesse optical cavity, and the fineness is greater than 10,000.

In this embodiment, the optical cavity of the sample chamber 15 is a high-finesse optical cavity, and the typical value of its fineness is greater than 10,000.

Further, based on the above embodiment of the present invention, the cavity length adjusting unit 17 is a piezoelectric ceramic unit.

In this embodiment, a piezoelectric ceramic unit is used to adjust the cavity length of the high-finesse optical cavity, which can improve the precision of the cavity length adjusting.

Figure 4:
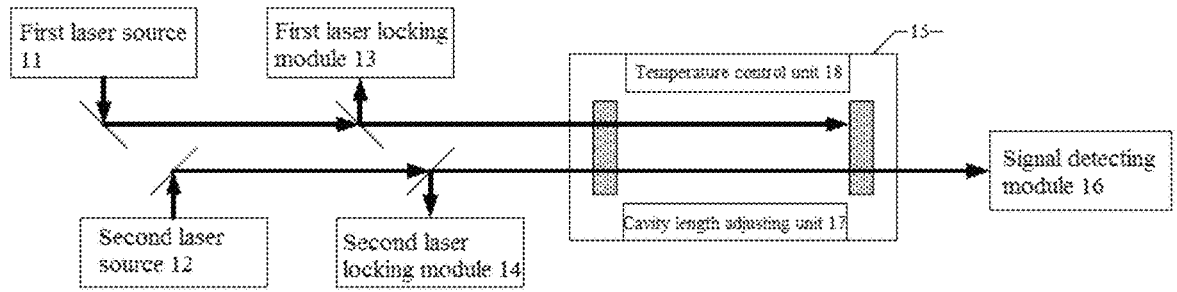
FIG. 4 is a schematic structural diagram of another device for quantitatively detecting carbon 14 isotope by a dual-wavelength method according to an embodiment of the present invention.

Further, based on the above embodiment of the present invention, referring to FIG. 4, FIG. 4 is a schematic structural diagram of another device for quantitatively detecting carbon 14 isotope by a dual-wavelength method according to an embodiment of the present invention.

The sample chamber 15 further comprises a temperature control unit 18;

the temperature control unit 18 is used to adjust the temperature of the optical cavity;

after adjustment, the fluctuation range of the temperature of the optical cavity is less than 100 mK.

In this embodiment, the temperature control unit 18 is mainly used to realize the temperature control of the high-fineness optical cavity, and the fluctuation range of the temperature of the optical cavity after temperature control needs to be less than 100 nK.

Figure 5:
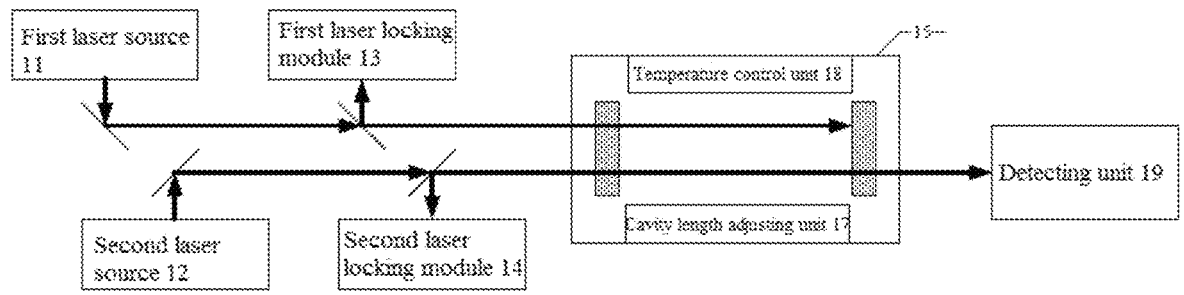
FIG. 5 is a schematic structural diagram of another device for quantitatively detecting carbon 14 isotope by a dual-wavelength method according to an embodiment of the present invention.

Further, based on the above embodiment of the present invention, referring to FIG. 5, FIG. 5 is a schematic structural diagram of another device for quantitatively detecting carbon 14 isotope by a dual-wavelength method according to an embodiment of the present invention.

The signal detecting module 16 comprises a detecting unit 19;

the detecting unit 19 is used to detect the optical cavity output signal of the second mid-infrared laser passing through the optical cavity, i.e., the transmission signal of the second mid-infrared laser passing through the optical cavity.

The detecting unit 19 detects the output signal of the optical cavity, which can be any one of the cavity enhanced absorption spectroscopy signal, the cavity ring-down spectroscopy signal, and the noise-immune cavity enhanced optical heterodyne molecular spectroscopy signal.

Figure 6:
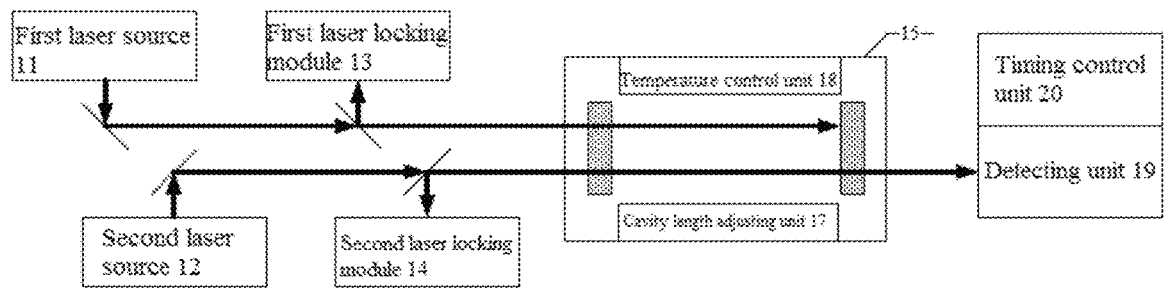
FIG. 6 is a schematic structural diagram of another device for quantitatively detecting carbon 14 isotope by a dual-wavelength method according to an embodiment of the present invention.

Further, based on the above embodiment of the present invention, referring to FIG. 6, FIG. 6 is a schematic structural diagram of another device for quantitatively detecting carbon 14 isotope by a dual-wavelength method according to an embodiment of the present invention.

The signal detecting module 16 further comprises: a timing control unit 20;

wherein the timing control unit 20 is used to control the working states of the cavity length adjusting unit and the detecting unit 19.

In this embodiment, the timing control unit 20 controls the cavity length adjusting unit 17 (a piezoelectric ceramic unit) to adjust the cavity length of the optical cavity, and controls the detecting unit 19 to detect the optical cavity output signal of the second mid-infrared laser passing through the optical cavity after the frequency of the first mid-infrared laser and the frequency of the second mid-infrared laser match with different energy levels of the target isotope molecule simultaneously.

Further, after the detection period ends, the timing control unit 20 is further used to control the cavity length adjusting unit 17 (a piezoelectric ceramic unit) to continue to adjust the cavity length of the optical cavity, so that the first mid-infrared laser and the second mid-infrared laser restarts to match with the optical cavity modes and the energy levels corresponding to the target isotope molecule.

Further, based on all the above embodiments of the present invention, another embodiment of the present invention also provides a spectrometer. The spectrometer comprises the devices for quantitatively detecting carbon 14 isotope by a dual-wavelength method according to the above embodiments of the present invention.

The spectrometer has the excellent characteristics of the device for quantitatively detecting carbon 14 isotope by a dual-wavelength method.

The device and the spectrometer for quantitatively detecting carbon 14 isotope by a dual-wavelength method have been described in detail above. Herein, specific examples are used to illustrate the principles and implementations of the present invention. The descriptions of the above examples are only used to help understand the methods and the core idea of the present invention. Furthermore, those of ordinary skill in the art can make modifications in the specific implementation and application scope according to the idea of the present invention. In summary, the contents of this specification should not be construed as limitation of the present invention.

It should be noted that each embodiment in this specification is described in a progressive manner, and each embodiment focuses on the differences from other embodiments. The same and similar parts among all the embodiments can be referred to each other. As for the devices disclosed in the embodiments, since they correspond to the methods disclosed in the embodiments, the description is relatively simple. The relevant part can be referred to the description of the method.

It should also be noted that herein, relational terms such as first and second are only used to distinguish one entity or operation from another entity or operation, and do not necessarily require or imply any such actual relationship or order among these entities or operations. Furthermore, the terms "comprising", "including" or any other variations thereof are intended to encompass a non-exclusive inclusion such that elements inherent to a process, a method, an article, or a device of a list of elements are included, or elements inherent to a process, a method, an article, or a device are included. Without further limitation, an element qualified by the phrase "comprising a . . . " does not preclude the presence of additional identical elements in a process, a method, an article or a device that includes the element.

The above description of the disclosed embodiments enables those skilled in the art to implement or use the present invention. Various modifications to these embodiments will be readily apparent to those skilled in the art, and the generic principles defined herein may be implemented in other embodiments without departing from the spirit or scope of the present invention. Thus, the present invention is not limited to the embodiments shown herein, but is to be accorded the widest scope consistent with the principles and novel features disclosed herein.

The invention claimed is:

1. A device for quantitatively detecting carbon 14 isotope by a dual-wavelength method, wherein the device comprises: a first laser source, a second laser source, a first laser modulator and demodulator, a second laser modulator and demodulator, a sample chamber and a signal detector;

the first laser source is configured to output a continuous first mid-infrared laser; the second laser source is configured to output a continuous second mid-infrared laser; the wavelengths of the first mid-infrared laser and the second mid-infrared laser are different;

the first laser modulator and demodulator is configured to lock the first mid-infrared laser in the optical cavity of the sample chamber; the second laser modulator and demodulator is configured to lock the second mid-infrared laser in the optical cavity of the sample chamber;

the sample chamber at least comprises a cavity length adjusting unit;

the cavity length adjusting unit is configured to adjust the cavity length of the optical cavity, to tune the mode frequency of the optical cavity, and then tune the frequencies of the first mid-infrared laser and the second mid-infrared laser, so that the frequency of the first mid-infrared laser and the frequency of the second mid-infrared laser match with different energy levels of a target isotope molecule simultaneously;

the signal detector is configured to detect an optical cavity output signal of the second mid-infrared laser passing through the optical cavity after the laser frequencies and the energy levels of the target isotope molecule are matched simultaneously;

wherein the target isotope molecule is $CO_2$ containing carbon 14 isotope, and the optical cavity output signal is a cavity enhanced absorption spectroscopy signal, a cavity ring-down spectroscopy signal, or noise-immune cavity enhanced optical heterodyne molecular spectroscopy signal.

2. The device according to claim 1, wherein the tuning bandwidth of the first mid-infrared laser is greater than 1 MHz;

the tuning bandwidth of the second mid-infrared laser is greater than 1 MHz.

3. The device according to claim 1, wherein the first laser modulator and demodulator is configured to lock the first mid-infrared laser in the optical cavity of the sample chamber, comprising:

the first laser modulator and demodulator is configured to modulate and demodulate the frequency and phase of the first mid-infrared laser, and generate an error signal;

the first laser modulator and demodulator is further configured to generate a negative feedback signal according to the error signal to control the frequency of the first mid-infrared laser, so that the first mid-infrared laser is locked in the optical cavity of the sample chamber;

the second laser modulator and demodulator is configured to lock the second mid-infrared laser in the optical cavity of the sample chamber, comprising:

the second laser modulator and demodulator is configured to modulate and demodulate the frequency and phase of the second mid-infrared laser, and generate an error signal;

the second laser modulator and demodulator is further configured to generate a negative feedback signal according to the error signal to control the frequency of the second mid-infrared laser, so that the second mid-infrared laser is locked in the optical cavity of the sample chamber.

4. The device according to claim 1, wherein the first mid-infrared laser and the second mid-infrared laser are collinear in the sample chamber.

5. The device according to claim 1, wherein the optical cavity is a high-finesse optical cavity, and the fineness is greater than 10,000.

6. The device according to claim 1, wherein the cavity length adjusting unit is a piezoelectric ceramic unit.

7. The device according to claim 1, wherein the sample chamber further comprises a temperature controller;

the temperature controller is configured to adjust the temperature of the optical cavity;

after adjustment, the fluctuation range of the temperature of the optical cavity is less than 100 mK.

8. The device according to claim 1, further comprising a timing controller;

wherein the timing controllor is configured to control the working states of the cavity length adjusting unit and the detector.

9. A spectrometer, wherein the spectrometer comprises the device according to claim 1.

* * * * *